(12) United States Patent
Pateromichelakis et al.

(10) Patent No.: US 11,729,711 B2
(45) Date of Patent: Aug. 15, 2023

(54) TECHNIQUES FOR RADIO ACCESS NETWORK (RAN) CONFIGURATION IN SLICE-BASED NETWORKS

(71) Applicant: Huawei Technologies Co., Ltd., Guangdong (CN)

(72) Inventors: Emmanouil Pateromichelakis, Munich (DE); Qing Wei, Munich (DE); Chenghui Peng, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/570,919

(22) Filed: Sep. 13, 2019

(65) Prior Publication Data
US 2020/0015154 A1 Jan. 9, 2020

Related U.S. Application Data

(63) Continuation of application No. PCT/EP2017/056350, filed on Mar. 17, 2017.

(51) Int. Cl.
*H04W 48/18* (2009.01)
*H04W 8/08* (2009.01)
*H04W 24/10* (2009.01)
*H04W 92/10* (2009.01)

(52) U.S. Cl.
CPC ............. *H04W 48/18* (2013.01); *H04W 8/08* (2013.01); *H04W 24/10* (2013.01); *H04W 92/10* (2013.01)

(58) Field of Classification Search
CPC ....... H04W 48/18; H04W 8/08; H04W 24/10; H04W 92/10
See application file for complete search history.

(56) References Cited

U.S. PATENT DOCUMENTS

| | | | |
|---|---|---|---|
| 9,392,471 B1 | 7/2016 | Thomas et al. | |
| 2016/0352924 A1 | 12/2016 | Senarath et al. | |
| 2016/0353268 A1 | 12/2016 | Senarath et al. | |
| 2017/0245316 A1* | 8/2017 | Salkintzis | H04W 48/16 |
| 2017/0339688 A1* | 11/2017 | Singh | H04W 76/11 |

(Continued)

FOREIGN PATENT DOCUMENTS

| | | |
|---|---|---|
| CN | 106375987 A | 2/2017 |
| GB | 2554661 A | 4/2018 |

(Continued)

OTHER PUBLICATIONS

U.S. Appl. No. 62/350,550, filed 2016.*
(Continued)

*Primary Examiner* — Rushil Parimal Sampat
(74) *Attorney, Agent, or Firm* — Womble Bond Dickinson (US) LLP

(57) ABSTRACT

The disclosure relates to a slice management entity for a radio access network (RAN), the slice management entity comprising a processor configured: to receive RAN slice information including at least one key performance indicator (KPI), a slice identifier (ID), and/or network slice selection assistance information (NSSAI) and the context changes, to determine a configuration comprising a pre-configuration for at least one slice of the RAN based on the RAN slice information, and to transmit a RAN slice configuration message to the RAN based on the configuration.

11 Claims, 8 Drawing Sheets

(56) References Cited

U.S. PATENT DOCUMENTS

| | | | |
|---|---|---|---|
| 2017/0367036 A1* | 12/2017 | Chen | H04L 43/08 |
| 2018/0124854 A1* | 5/2018 | Myhre | H04W 76/10 |
| 2018/0176858 A1* | 6/2018 | Wang | H04W 8/20 |
| 2019/0021047 A1 | 1/2019 | Zong | |
| 2019/0075512 A1 | 3/2019 | Jin et al. | |
| 2020/0053531 A1* | 2/2020 | Myhre | H04W 48/18 |
| 2020/0305054 A1* | 9/2020 | Zee | H04W 36/0061 |

FOREIGN PATENT DOCUMENTS

| | | |
|---|---|---|
| WO | 2017005208 A1 | 1/2017 |
| WO | 2017044153 A1 | 3/2017 |
| WO | 2017121454 A1 | 7/2017 |
| WO | 2017181779 A1 | 10/2017 |

OTHER PUBLICATIONS

WO 2018/006221 A1 (Year: 2016).*
WO 2017171598 A1 (Year: 2016).*
3GPP TR 23.799 V14.0.0 (Dec. 2016),3rd Generation Partnership Project;Technical Specification Group Services and System Aspects;Study on Architecture for Next Generation System(Release 14),total 522 pages.
3GPP TR 38.801 V14.0.0: 3rd Generation Partnership Project;Technical Specification Group Radio Access Network; Study on new radio access technology: Radio access architecture and interfaces(Release 14) Mar. 2017 total 91 pages.
3GPP TR 38.801 V1 2.0(Feb. 2017),3rd Generation Partnership Projectjechnical Specification Group Radio Access Network;Study on new Radio Access Technology;Radio Access Architecture and Interfaces(Release 14),total 90 pages.
Deliverable D2.2,Draft Overall 5G RAN Design,Version: v1.0,Mobile and wireless communications Enablers for the Twenty-twenty Information Society—II,Jun. 30, 2016,total 95 pages.
5g Americas: 11Network Slicing for 5G Networks and Services,White Paper,Nov. 1, 2016 (Nov. 1, 2016), total 36 pages.
China Mobil e Comnunications et al: "5G Service-Guaranteed Network Slicing",White Paper,Feb. 28, 2017 (Feb. 28, 2017),total 26 pages.
3GPP TR 23.799 V2.0.0 (Nov. 2016);3rd Generation Partnership Project;Technical Specification Group Services and System Aspects;Study on Architecture for Next Generation System(Release 14);total 523 pages.
3GPP TR 38.801 V1.0.0 (Dec. 2016);3rd Generation Partnership Project;Technical Specification Group Radio Access Network;Study on New Radio Access Technology;Radio Access Architecture and Interfaces(Release 14);total 72 pages.
3GPP TR 38.801 V0.6.0 (Oct. 2016);3rd Generation Partnership Project; Technical Specification Group Radio Access Network;Study on New Radio Access Technology;Radio Access Architecture and lnterfaces(Release 14);total 55 pages.
Deliverable D5.1;Draft Synchronous Control Functions and Resource Abstraction Considerations; Version: v1.0,Mobile and wireless commmunications Enablers for the Twenty-twenty Information Society—II,May 31, 2016,total 129 pages.
Rachid El Hattachi et al.,"5G White Paper by NGMN Alliance",V 1.0,Feb. 17, 2015,total 125 pages.
Jan Groenendijk, Ericsson, Minutes for Minutes for Study on Management and Orchestration of Network Slicing, 3GPP TSG SA WG5 (Telecom Management) Meeting #110, S5-166030, Nov. 14-18, 2016, Reno (US), 16 pages.
SA WG2 Meeting #118bis,S2-170168:"Proposed alignments of Network Slicing Conclusion with 5G Core Overall Architecture",ZTE, Sprint, Oracle,16 Jan. 20, 2017, Spokane, WA, USA,total 8 pages.
S2-171027 ZTE et al.,"Proposed architecture alignments of Network Slicing Conclusion with 5G Core Overall Architecture in TS 23.501",SA WG2 Meeting #119,Feb. 13 - 17, 2017, Dubrovnik, Croatia,total 7 pages.
Huawei, Key principles for support of Network Slicing in RAN, 3GPP TSG-RAN WG3 AH, R3-170225, Spokane, Washington, USA, Jan. 17 -19, 2017, 3 pages.
Xu Dai et al., An on demand, software defined and services oriented network slice architecture, Telecommunications Network Technology, 2016, 5 pages.

* cited by examiner

TECHNIQUES FOR RADIO ACCESS NETWORK (RAN) CONFIGURATION IN SLICE-BASED NETWORKS

CROSS-REFERENCE TO RELATED APPLICATIONS

This application is a continuation of International Application No. PCT/EP2017/056350, filed on Mar. 17, 2017, the disclosure of which is incorporated herein by reference in its entirety

TECHNICAL FIELD

The present disclosure relates to techniques for radio access network (RAN) configuration in slice-based networks, in particular adaptive RAN configuration in slice-based new radio (NR) networks.

BACKGROUND

According to 3GPP TR. 38.801, "Study on New Radio Access Technology: Radio Access Architecture and Interfaces", Rel. 14, V1.0.0, 2016-12-08, RAN shall support the selection of the RAN part of the network slice, by one or more slice ID(s) provided by the user equipment (UE) or the core network (CN) which unambiguously identifies one or more of the pre-configured network slices in the PLMN (public land mobile network). Furthermore, RAN shall support a differentiated handling of traffic for different network slices which have been pre-configured. In this context, 3GPP TR. 23.799, "Study on Architecture for Next Generation System", Rel. 14, V2.0.0, 2016-12-07 defines configured and accepted NSSAI (network slice selection assistance information) used by RAN to help on deciding the RAN configuration.

It is not yet specified as to how NSSAI is mapped to Slice_ID, how Slice_ID is mapped to RAN configuration, how RAN configuration looks like and how RAN configuration should be performed.

SUMMARY

It is the object of the invention to provide a concept for an efficient RAN configuration in slice-based networks.

This object is achieved by the features of the independent claims. Further implementation forms are apparent from the dependent claims, the description and the figures.

Besides abstracting context from UE/CN used to decide the RAN configuration and the procedure to get them, the core idea includes also determining the decision mechanism and the configuration procedure for the adaptation of RAN configuration at RAN. The disclosed RAN configuration can be subdivided in two parts:

A first part is related to SA5, slice management domain presenting a mechanism for per slice RAN configuration and RAN configuration adaptation within each slice. Two phases of RAN configuration, i.e. a pre-configuration phase and an adaptation phase, can be identified: The first phase is a RAN pre-configuration at the deployment phase, to identify recommended RAN configuration mode per slice type (based on NSSAI/Slice ID). The second phase is a RAN configuration adaptation to cope with changes in different time scales, i.e. slow changes and fast changes. Slow changes may be related to e.g. change of the traffic situation at the RAN, group UE mobility, change of backhauling capacity, etc. Fast changes may be related to e.g., communication protocol of individual traffic flow, dynamic RAN topologies, individual UE mobility, critical slice traffic, etc.

A second part is related to SA2, RAN3, context and signaling domain presenting a context exchange to support RAN configuration adaptation within each slice. This may include: receiving context information related to UE (e.g., mobility, multi-air interface measurements, UE capabilities, etc.); receiving context information from the CN (e.g., communication protocol, etc.); receiving abstract of RAN configuration from the CN, which will be mapped to a network slice; and forwarding RAN configuration adaptation decision to the involved nodes (e.g., UE, gNBs, CN).

This disclosure fills the gap on slice realization at the RAN side and can provide standardization impact on 3GPP TR. 38.801, SA2 TS on 5G network function description, and SA2 TS on 5G procedure regarding the context exchanged to decide on the RAN configuration, as well as SA5 on the RAN configuration/reconfiguration method.

In order to describe the invention in detail, the following terms, abbreviations and notations will be used:
UE: User Equipment
RAN: Radio Access Network
CN: Core Network
PLMN: Public Land Mobile Network
NSSAI: Network Slice Selection Assistance Information
TS: Technical Specification
KPI: Key Performance Indicator
PPI: Power Preference Indication
RSRP/Q: Reference Signal Received Power/Quality
CSI: Channel State Information
CQI, RI, PMI: Channel Quality Indicator, Rank Indicator, Precoding matrix index
RLM: Radio Link Monitoring
AIV: Air Interface Variant
NAS: Non-access Stratum
SCTP: Stream Control Transmission Protocol
TCP: Transport Communication Protocol
GTP-U: GPRS Tunneling Protocol (GTP)-U
UDP: User Datagram Protocol
GRE: Generic Routing Encapsulation
PDU: Protocol Data Unit
eMBB: extreme Mobile Broadband
URLLC: Ultra-Reliable and Low Latency Communication
mIOT: massive Internet of Things
PDCP: Packet Data Convergence Protocol
CU/DU: Central Unit/Distributed Unit
CP/UP: Control Plane/User Plane
DSS: Domain Support System
SSS: Slice Support System According to a first aspect, the invention relates to a slice management entity for a Radio Access Network (RAN), the slice management entity comprising a processor configured: to receive RAN slice information, in particular at least one Key Performance Indicator (KPI), a Slice Identifier (ID), and/or Network Slice Selection Assistance Information (NSSAI), to determine a configuration, in particular a pre-configuration, for at least one slice of the RAN based on the RAN slice information, and to transmit a RAN Slice configuration message to the RAN based on the configuration.

Such slice management entity can be used for providing an efficient RAN configuration in slice-based networks. The RAN can be a base station or a group of base stations. Such slice management entity provides the advantage of setting up a slice more effectively and of benefiting from more efficient resource allocation.

In one embodiment, the configuration comprises information for an operation of the slice at the RAN, in particular information on a process, a protocol function, and/or a resource required by the slice.

Such slice management entity provides the advantage that it can adapt more effectively to a context or to changes of a context.

In one embodiment, the slice management entity is configured to reside as a RAN domain specific management entity at a domain support system (DSS); and the slice management entity comprises an interface to a cross domain management entity at a slice support system (SSS) for communicating configuration information.

A cross domain management entity can be an entity that provides information to different slice management entities (i.e., to different DSSs) and/or between a slice management entity and other domain specific management entities, e.g., a transport slice management entity or a core slice management entity (i.e., to a single DSS). Such slice management entity provides the advantage that it can synchronize configuration information with other slice management entities or other slice related entities of the same DSS.

In one embodiment, the processor is further configured: to receive a context change message from the RAN indicating a change of context with respect to a change of information on a process, a protocol function, and/or a resource of the RAN and/or traffic at the RAN, and to adjust the configuration for the RAN based on the change of context.

This provides the advantage that the slice management entity can immediately change the context if required.

In one embodiment, the context change message indicates a change of a traffic and/or a requirement related to traffic at the RAN, handover requests from a group of UEs and/or a change of backhauling conditions and availability.

Such slice management entity provides the advantage that it can efficiently adapt the slice configuration to traffic changes, handover requests and/or backhauling changes.

In one embodiment, the processor is configured to transmit the RAN Slice configuration message based on configuration updates in terms of protocols and RAN functions for the at least one slice.

Such slice management entity provides the advantage that configuration updates can be considered without producing delay.

According to a second aspect, the invention relates to a Radio Access Network (RAN) entity, comprising a processor configured: to receive a RAN slice configuration message, in particular by a slice management entity according to the first aspect or any of the implementation forms of the first aspect, wherein the RAN slice configuration message comprises a configuration, in particular a pre-configuration, for at least one slice of the RAN, and to transmit a RAN configuration message to at least one user equipment (UE) based on the RAN slice configuration message.

Such RAN entity can be used for providing an efficient RAN configuration in slice-based networks. The UE can also adapt its part of the slice.

In one embodiment, the RAN configuration message comprises a slice ID of the at least one slice, at least one network function associated with the at least one slice and/or a flag indicating an uplink or downlink configuration.

Such RAN entity provides the advantage that it conveys the necessary context of the configuration to the involved entities.

In one embodiment, the RAN slice configuration message comprises a configuration update for the at least one slice, and the processor is configured to transmit the RAN configuration message based on the configuration update.

Such RAN entity provides the advantage that efficient configuration updates can be provided without producing significant latency.

In one embodiment, the processor is configured to detect a change of context at the RAN, in particular a change of information on a process, a protocol function, and/or a resource of the RAN and/or traffic at the RAN, and to transmit a context change message to the slice management entity responsive to detecting the change of context.

Such RAN entity provides the advantage that the slice configuration can be efficiently adapted to a context change at the RAN.

In one embodiment, the processor is configured: to detect the change of context at the RAN for the at least one Slice based on mobility information from the at least one UE associated with the at least one slice of the RAN.

Such RAN entity provides the advantage that the context change at the RAN also considers conditions at the UE.

In one embodiment, the processor is configured: to detect the change of context at the RAN for the at least one slice based on information from at least one neighboring RAN entity, in particular a different operator RAN entity, the information indicating a change of context at the at least one neighboring RAN entity.

Such RAN entity provides the advantage that the context change at the RAN also considers conditions at neighboring RANs.

In one embodiment, the processor is configured to generate context information based on UE measurements on different air interface variants (AIV), communication protocols and/or slice-related information from the at least one UE, the RAN and/or a core network (CN) associated with the RAN.

Such RAN entity provides the advantage that the context change at the RAN considers all available information from UE, RAN and CN.

In one embodiment, the processor is configured to adjust the configuration for the at least one slice of the RAN according to user and/or slice requirements based on the context information.

Such RAN entity provides the advantage that the configuration can be flexibly updated based on user and/or slice requirements.

In one embodiment, the processor is configured to generate the context information based on information from adjacent RAN nodes and/or adjacent base station, in particular information about capability, load, backhaul and/or cell density.

Such RAN entity provides the advantage that the configuration can be flexibly updated based on information from adjacent RAN nodes and/or adjacent base station.

In one embodiment, the information from the CN comprises packet data unit (PDU) type and/or communication protocol indication.

Such RAN entity provides the advantage that the information from the CN can be efficiently transported by a PDU.

In one embodiment, the information from the CN is indicated via RAN-to-core-network interface on user plane (UP) or via RAN-to-core-network interface signaling on control plane (CP).

Such RAN entity provides the advantage that the information from the CN can be flexibly indicated via user plane or control plane.

BRIEF DESCRIPTION OF THE DRAWINGS

Further embodiments of the disclosure will be described with respect to the following figures, in which.

DETAILED DESCRIPTION OF EMBODIMENTS

Figure 1:
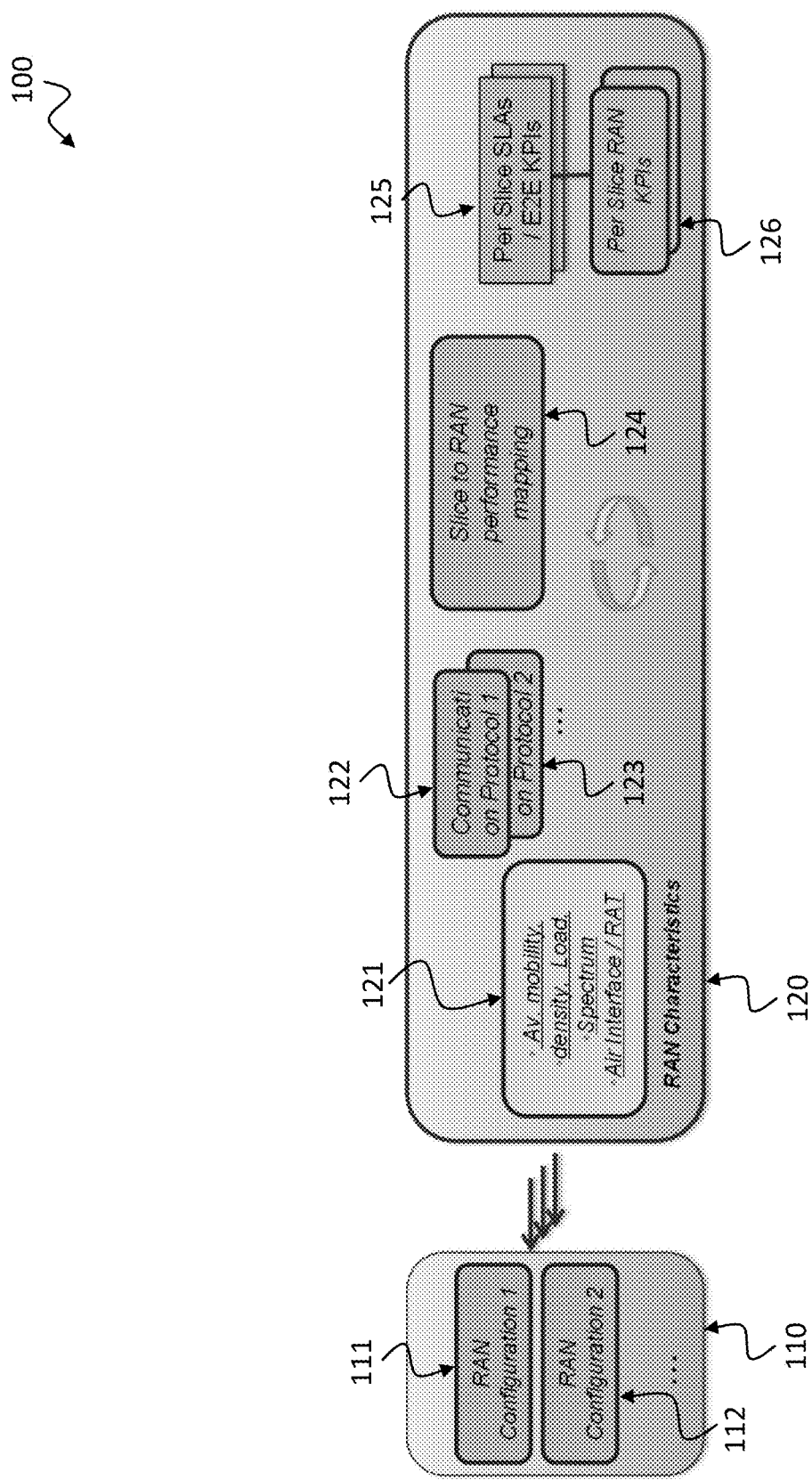
FIG. 1 shows a schematic diagram illustrating a context abstraction framework 100 for a radio access network (RAN) according to one embodiment.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz. The frequency range may correspond to frequencies of alternating current electrical signals used to produce and detect radio waves.

The devices and systems described herein may include processors. In the following description, the term "processor" describes any device that can be utilized for processing specific tasks (or blocks or steps). A processor can be a single processor or a multi-core processor or can include a set of processors or can include means for processing. A processor can process software or firmware or applications etc.

In the following slice-based new radio (NR) networks, i.e. communication networks with multiple network slices are described. A "slice" or a "network slice" is a fully operational logical network containing all required protocols and network resources. In some deployments, network slices can be considered as completely individual networks which however belong to the same network operator. This gives to the network operator the ability to share resources among the network slices for meeting the respective slice demands. In some deployments, network slices may share some user plane (UP) and/or control plane (CP) functionalities and/or the same pool of network resources may be shared by the network slices, e.g., a pool of radio resources, such as, frequency and time resources.

In the following, radio access networks (RANs), e.g. 5G RANs, and network slices are described. In 5G RAN, use cases originating from vertical industries (e.g. automotive, e-health, smart grid, etc.) will be considered as drivers for 5G requirements. 5G network should be able to adapt to their needs in terms of latency, reliability, security, QoS, etc. To this end, the introduction of network slices, which are logical end-to-end sub-networks corresponding to different verticals, is envisioned as a key 5G feature according to Next Generation Mobile Networks (NGMN) Alliance, "5G White Paper", February 2015. Network slices may impact the RAN design, since RAN needs to be aware of the requirements from different slices and provide the services accordingly. However, due to different deployment and characteristics of the RAN at different site, handling of slices can be different. Moreover, dynamic situations at the RAN (e.g., load situation, UE mobility, characteristics of individual traffic flow, etc.) may influence the actual RAN treatments for certain slice. This disclosure targets at providing the slice-aware RAN services with joint considerations of diverse RAN characteristics and dynamic situations.

RAN configurations determine the RAN behavior and also the services provided by RAN. RAN may have some pre-defined abstract RAN Configurations per slice (e.g., specified in operations, administration and maintenance (OAM)). When RAN gets some indication of slice from the core network or user equipment (UE) (e.g., slice ID), it maps slice ID to pre-defined abstract RAN configurations. However, such abstract RAN Configuration is not enough to map slices to RAN configurations due to dynamic situations on channel/resource availability, user mobility, isolation requirements at RAN, etc. And local adaptation will be required to allow for flexible tuning of RAN protocol/split configuration based on parameters like slice scalability, RAN configuration sharing between slices, isolation and RAN characteristics.

Disclosed devices, systems and methods described in the following provide solutions for the above addressed issues by: 1) taking into account new context information (RAN characteristics, multiple communication protocols to CN, abstract RAN configuration-to-slice mapping and different service types), efficiently abstracting and building this context information at RAN side, mapping different traffic flows to different RAN configurations (RAN functions and deployment); and 2) defining the nature of slice aware RAN configuration and identifying who decides the RAN configurations and with which criteria; and determining how the RAN (re)configurations can be applied to the RAN. Such solutions are described in detail below with respect to FIGS. 1 to 8.

FIG. 1 shows a schematic diagram illustrating a context abstraction framework 100 for a RAN according to one embodiment.

For each network slice, RAN characteristics 120, like UE mobility, user/cell density, spectrum, air interface variant 121, required slice KPIs 126 (e.g., reliability, delay, etc.) and also used communication protocol 123 require different actions from RAN node (e.g., gNBs, access points) point of view, to meet the e2e KPIs 125. So, different user plane configuration and possible different functions/protocols and placements are considered. An abstraction of such context information (e.g., communication protocol, RAN characteristics (UE, BS), abstracted RAN configuration 111, 112 and slice requirements (KPIs)) may be required to dynamically select the RAN configuration 110 and process the flows accordingly.

According to one embodiment, the RAN configuration can be divided in two phases: a pre-configuration phase, e.g. as described below with respect to FIG. 2 and a re-configuration phase (run time adaptation), e.g. as described below with respect to FIG. 3. An abstract pre-configuration can be decided at the network deployment phase. In case of data flows, the pre-configuration can be adjusted according to the actual situation. This adjustment can be done with different time granularity based on the time granularity of the adaptation (e.g., the pre-configuration may need to be changed when the RAN deployment changes).

Subdividing the RAN configuration in these two phases provides the following advantages: The RAN configuration can be provided in an adaptive manner based on communication protocols of individual data flows (tunnel-based, tunnel-less, connection-less protocols, PDU types). The RAN configuration can further be adaptively provided in case of dynamic RAN deployment and RAN characteristics (e.g., function split, self-backhauling, dual connectivity, frequency band, etc.).

The adaptation of RAN configuration is not limited to the U-plane traffic from the CN. It can also apply on the C-plane traffic from the CN, which also needs to be transported to UE via RAN (e.g., NAS message). New/future communication protocols can also be supported by some extension of this disclosure.

The adaptation capability at the RAN decouples the influence of local variations/dynamics from the abstract per slice RAN configurations. This facilitates the slice management from an end to end point of view. The pre-configuration enables RAN to provide different services per slice in a short time. The RAN can also provide an expected range of KPIs per slice from the pre-configuration to the network (e.g., CN slice selection entity, end-end slice orchestrator).

With different levels of adaptation (based on time scale), the solution according to this disclosure is able to provide different granularity and speed of adaptation on the RAN configuration depending on the actual situation.

Figure 2:
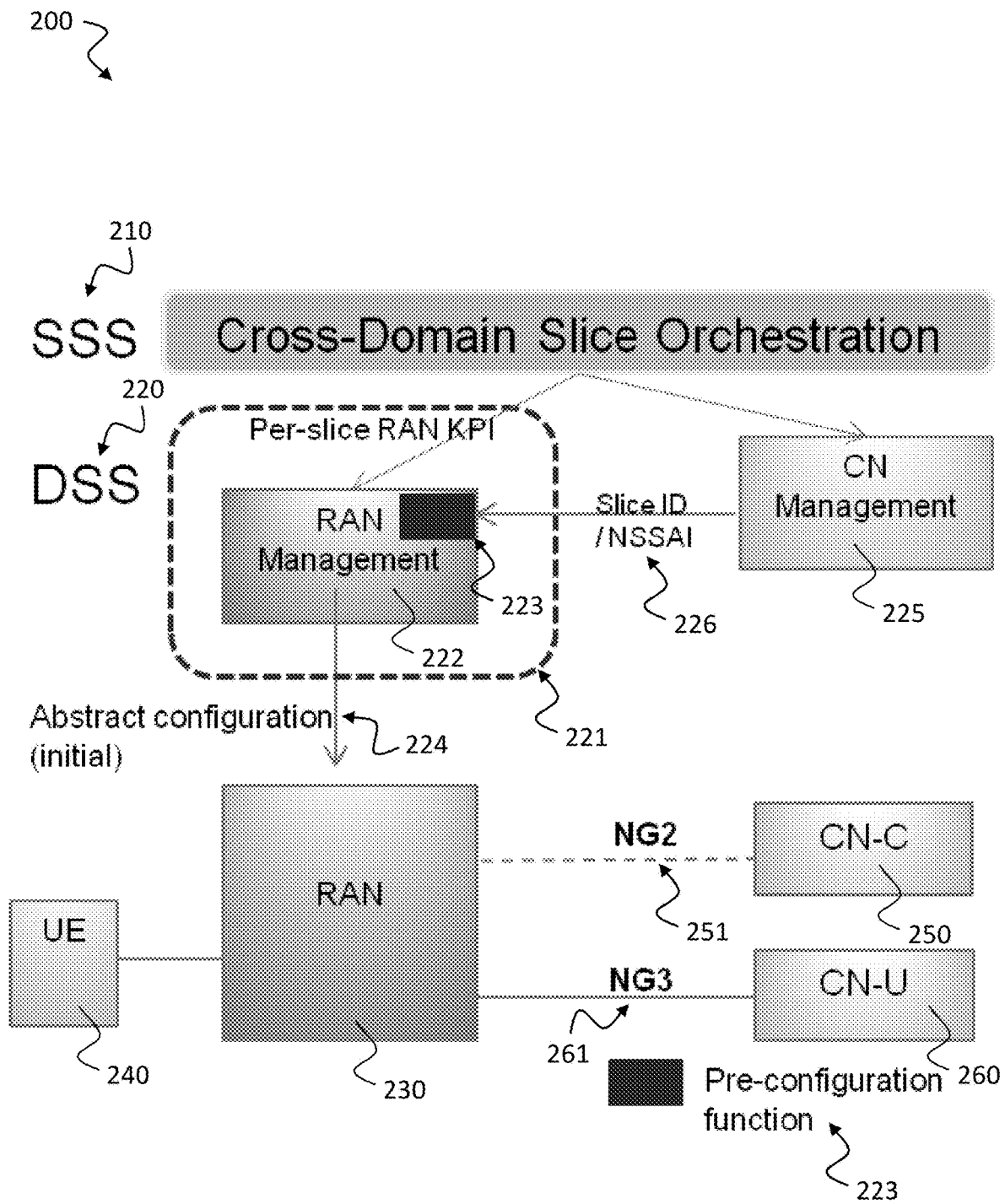
FIG. 2 shows a schematic diagram illustrating a pre-configuration process 200 of a RAN according to one embodiment.

FIG. 2 shows a schematic diagram illustrating a pre-configuration process 200 of a RAN according to one embodiment.

At the management place, the RAN slice management logical entity 222 (which can reside at DSS 220, which is a single vendor management entity for individual domains) defines initial abstract configuration per slice based on the target KPI 221 per slice type (e.g. eMBB, URLLC, mIOT) and RAN capabilities. Upon instantiation of a RAN slice which is handled at SSS 210 (cross domain multi-vendor management), a pre-configuration function 223 maps the received slice ID 226 to an initial abstract configuration, and sends a request 224 including this configuration to RAN part 230. RAN 230 applies the correspondent RAN configuration to RAN functions at each node (e.g., gNB). An example RAN configuration includes context information (e.g. the configuration of protocols/functions which are required by this slice), but this decision is made having the following assumptions: 1) To be supported slice-types, per slice RAN KPIs, where RAN capabilities are known; and 2) Based on long term provisioning of resources (conditions and availability).

So, as can be seen in FIG. 2, the RAN domain slice management entity 222 (e.g. OAM, DSS) sends an abstracted version of this information to RAN nodes 230 (gNBs), as can also be seen in the message chart 400 described below with respect to FIG. 4 at the network deployment phase. This abstracted information can be sent via a RAN slice configuration message 224 (from DSS 220 to RAN node 230) which includes: 1) a list of Slice IDs; 2) Abstract configuration in terms of protocols and RAN Functions per slice; and 3) RAN part KPI.

Based on this pre-configuration message 224, RAN 230 broadcasts (e.g. using SIB) the RAN configuration message 224 to the user terminals 240 using RAN Configuration message (RAN-UE) which includes: 1) slice ID; 2) a set of network functions (NFs) as part of the configuration; and 3) a flag for UL/DL, since the configuration may be different between uplink (UL) and downlink (DL).

Exemplary implementations of a slice management entity 700 as RAN slice management logical entity 222 residing in the DSS 220 and a RAN entity 800 residing in the RAN 230 are described below with respect to FIGS. 7 and 8.

Figure 3:
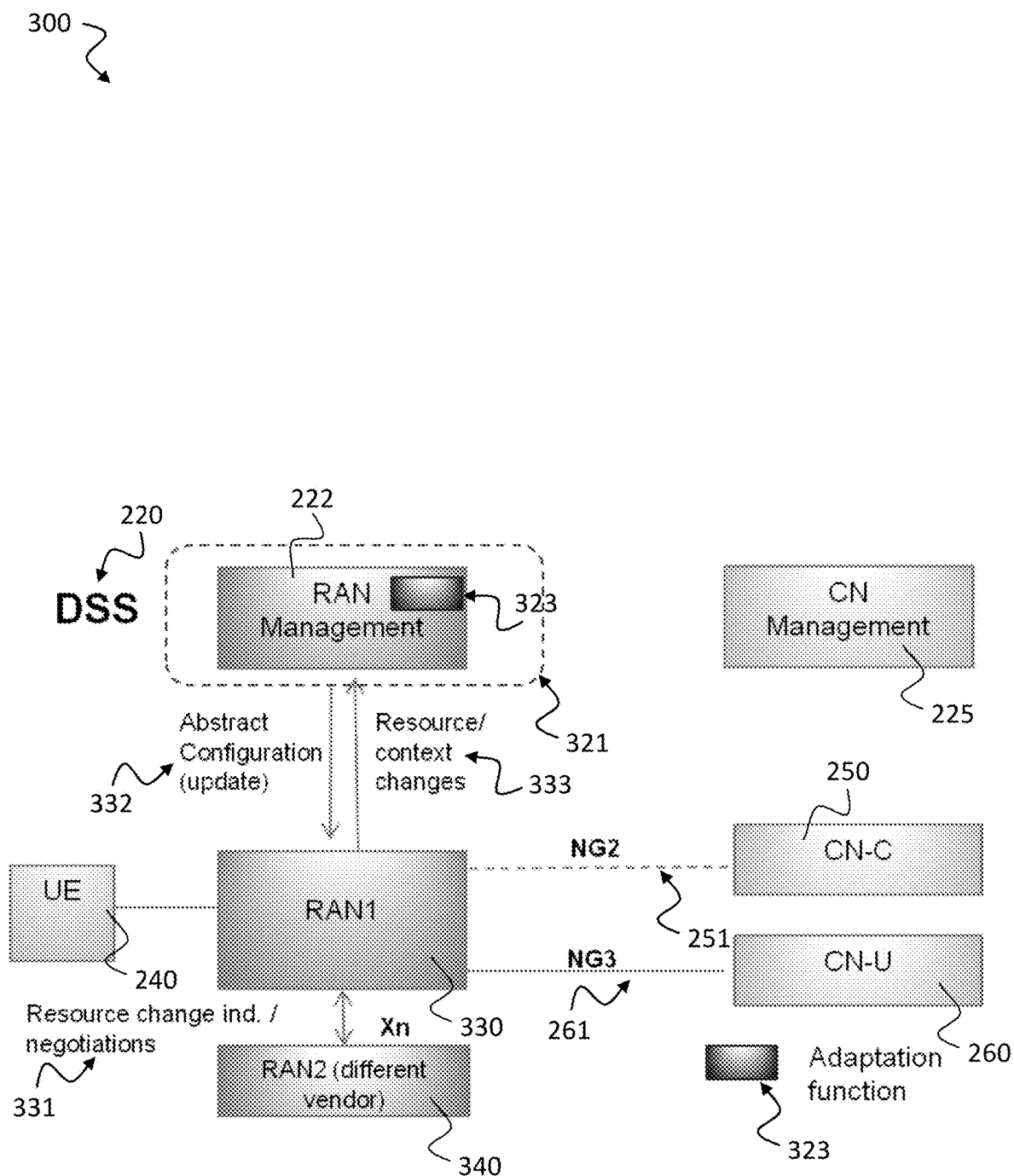
FIG. 3 shows a schematic diagram illustrating a RAN configuration adaptation operation 300 for a RAN according to one embodiment.

FIG. 3 shows a schematic diagram illustrating a RAN configuration adaptation operation 300 for a RAN according to one embodiment.

The adaptation at the management layer as shown in FIG. 3, e.g. by using an adaptation function 323, is essential for gross adaptation of the RAN configuration (e.g., for change of the traffic situation at the RAN, group UE mobility, change of backhauling capacity, for better provisioning of the RAN resources etc.). This can be triggered by the certain amount of abstract resource/context changes 333 received from RAN control entity 330. The RAN slice management entity 222 (that can reside at DSS 220) decides on the update of abstract configuration 332 and sends to RAN nodes 330 (gNBs) per slice, taking into account the resource situation changes and availability at RAN. Short-term or fine adaptation of RAN configuration can also be performed (e.g., communication protocol of individual traffic flow, individual UE mobility, etc.) to meet fast changes at the control layer especially for delay critical slices.

Here, a particular embodiment for the RAN side is to have RAN deployments from different vendors 340 with overlapping coverage or sharing of radio resources. In this case, new messages are forwarded between RAN elements (e.g., over Xn) for resource negotiations and indications 331 (e.g., load, interference, changes on AIVs).

Exemplary implementations of a slice management entity 700 as RAN slice management logical entity 222 residing in the DSS 220 and a RAN entity 800 residing in the RAN1, 330 or in the RAN2, 340 are described below with respect to FIGS. 7 and 8.

Figure 4:
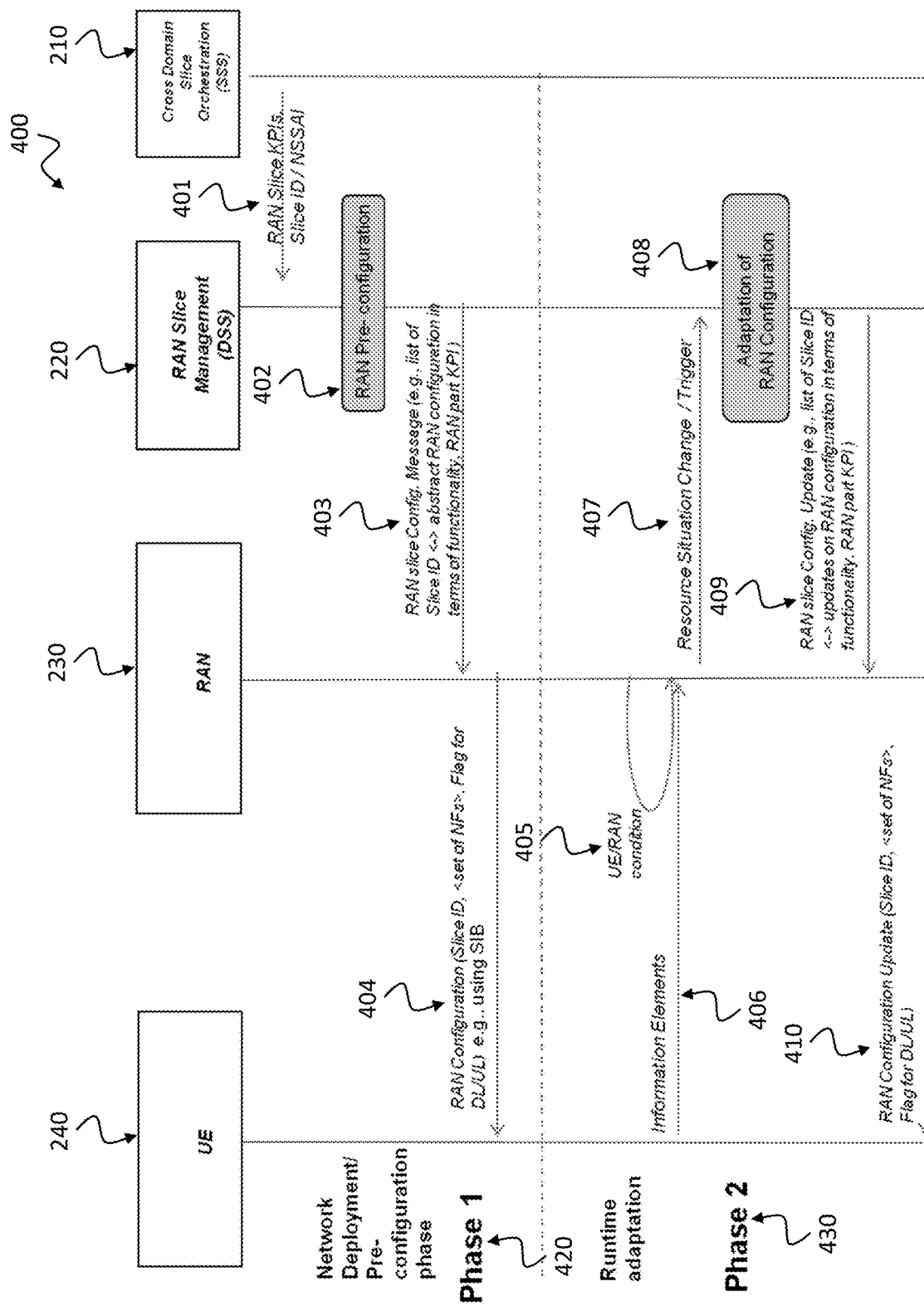
FIG. 4 shows an exemplary message sequence chart 400 for a RAN configuration operation including two phases according to one embodiment.

FIG. 4 shows an exemplary message sequence chart 400 for a RAN configuration operation including two phases according to one embodiment. The message sequence chart 400 describes the messages between different entities which are: UE 240, RAN 230, e.g. a RAN entity 800 as described below with respect to FIG. 8, RAN slice management (DSS) 222, e.g., a slice management entity 700 as described below with respect to FIG. 7, and cross domain slice orchestration 210, e.g. an SSS 210 as described above with respect to FIG. 2.

The message sequence chart 400 incorporates both pre-configuration phase (Phase 1, 420), e.g. as described above with respect to FIG. 2 and adaptation phase (Phase 2, 430), e.g. as described above with respect to FIG. 3.

With respect to the pre-configuration phase 420, the cross domain slice orchestration 210 transmits information 401 to RAN slice management 222. This information 401 may include RAN slice KPIs, slice ID and/or NSSAI as described above with respect to FIG. 2. Based on this information 401 RAN slice management 222 determines a suitable RAN pre-configuration 402 and transmits a RAN slice configuration message 403 to the RAN 230. The RAN slice configuration message 403 may include e.g. a list of slice ID, abstract RAN configuration in terms of functionality and/or RAN part KPI. Based on receiving this RAN Slice configuration message 403 the RAN 230 transmits a RAN configuration message 404 to the UE 240 or to multiple UEs. This RAN configuration message 404 may include the slice ID, a set of network functions (NFs) and/or a flag for DL/UL, e.g., using SIB.

With respect to the adaptation phase 430, RAN 230 determines context information, e.g. based on information elements 406 received from the UE 240 or UE/RAN condition 405 detected by the RAN 230. As can be exemplified in FIG. 4, based on the context information RAN 230 can send a resource situation trigger message 407 (RAN-DSS) to trigger the adaptation 408 of configuration. The management entity 222 then sends the RAN slice configuration update message 409 (DSS-RAN) to the RAN 230. The RAN slice configuration update message 409 may include a list of slice IDs, updates on configuration in terms of protocols and RAN Functions per slice, and/or RAN part KPI. Based on this adaptation message 409, RAN 230 can broadcast (e.g. using SIB) the adapted RAN configuration message 410 to the user terminals 240.

Exemplary implementations of a slice management entity 700 as RAN slice management entity 222 residing in the DSS 220 and a RAN entity 800 residing in the RAN, 230 which may perform the above described message chart 400 are described below with respect to FIGS. 7 and 8.

One key idea is to build new context information based on the UE measurements on different AIVs, the communication protocols, and the slice related information (slice KPIs, slice to RAN mapping, slice indication, pre-configured abstract RAN configuration) from UE, RAN and CN. Based on this new context, the RAN configurations can be dynamically adjusted to meet the user/slice requirements. One other input to this decision can be the level of RAN slice isolation. To optimize RAN resource utilization in RAN flexible isolation/sharing in different levels (e.g., full, partial, no isolation) may be provided. In this case, the level of isolation is known the RAN configurations can be accordingly adjusted.

From UE side, 3GPP Release 13 provides context data as information elements (UE power preference indicator (PPI), RRM measurements (RSRP, RSRQ) of serving and neighboring cells, CSI measurements (CQI, RI, PMI), RLM measurements, etc.

In 5G specification METIS II Deliverable, D5.1, "Draft synchronous control functions and resource abstraction considerations", July 2016, the extended UE context is investigated for multiple Air Interface Variants (AIVs) (e.g. eLTE, 5G AIVs) and 5G service types. These can be Inter/Intra-AIV measurements and interference levels, Mobility/Accuracy, etc.

Also, more context may be required from adjacent BSs or RAN nodes (BS capability, load, backhaul, cell density, etc.) to build this new context. The new context exchange method within RAN can be: 1) X2 between BSs (BS measurements, interference indications); 2) Uu from UE to BS (CSI/RRM/RLM per AIV, mobility).

The context (e.g., communication protocol, slice information) can be retrieved from the CN. From CN, the context will be mainly the communication protocol, which can be NAS (over SCTP), TCP (over GTP-U), UDP (over GRE), etc. The context representation can have the following format: <PDU session ID, communication protocol, PDU type>, as described below with respect to FIG. 5.

Figure 5:
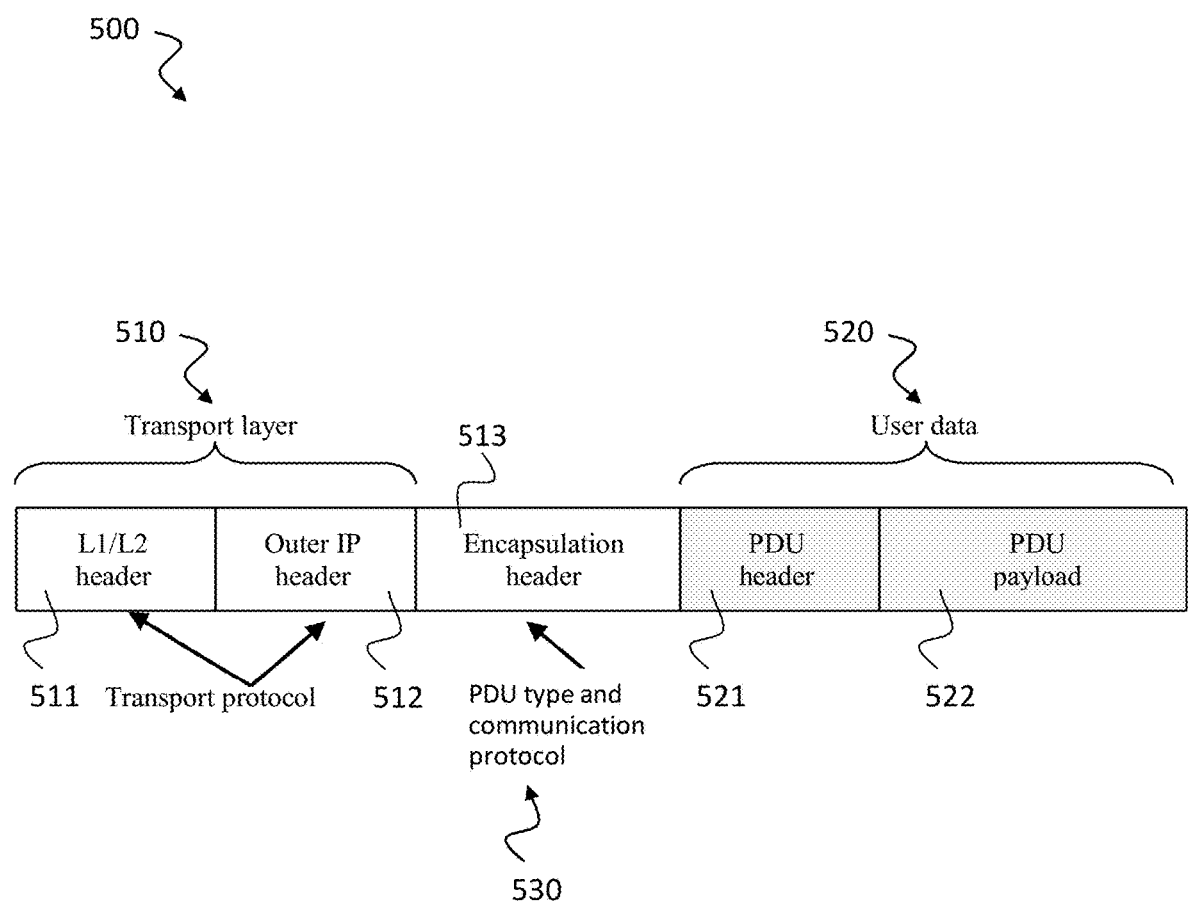
FIG. 5 shows a schematic diagram illustrating a protocol data unit (PDU) 500 with PDU type and CP indication via NG3 according to one embodiment.

FIG. 5 shows a schematic diagram illustrating a protocol data unit (PDU) 500 with PDU type and CP indication via NG3 according to one embodiment. The exemplary PDU 500 includes transport layer section 510, a user data section 520 and an encapsulation header 513 in between. The transport layer section 510 includes a L1/L2 header 511 and an outer IP header 512. The user data section 520 includes a PDU header 521 and a PDU payload 522. In the encapsulation header 513 information about PDU type and communication protocol 530, i.e. information about the above described context, may be included.

The context representation as described above with respect to FIG. 4 can have the following format: <PDU session ID, communication protocol, PDU type>, where: 1) PDU type can be Ethernet, IP, unstructured PDU, etc., 2) the context on communication protocol, PDU type is mapped to QoS profile at the RAN node (e.g., gNB).

Context exchange method between RAN 230 and CN 250, 260 can be either via NG2 signaling 251 (in control plane) as depicted in FIGS. 2 and 3, which is provided at PDU session establishment to the RAN together with the QoS profiles, e.g., according to 3GPP TR. 23.799, "Study on Architecture for Next Generation System", Rel. 14, V2.0.0, 2016-12-07.

Otherwise, this can be indicated via NG3 261 (data plane) as depicted in FIGS. 2 and 3 as follows: Encapsulation header including PDU type and communication protocol in use according to TR 23.799; and transport layer header for retrieving the transport protocol (in case it is needed).

Furthermore, RAN may obtain the indication of slice, some optional required slice KPIs (e.g., reliability, delay, etc.) from UE/CN. It may also obtain the RAN isolation level for the supported slices and the slice-to-RAN performance mapping from the CN.

Figure 6:
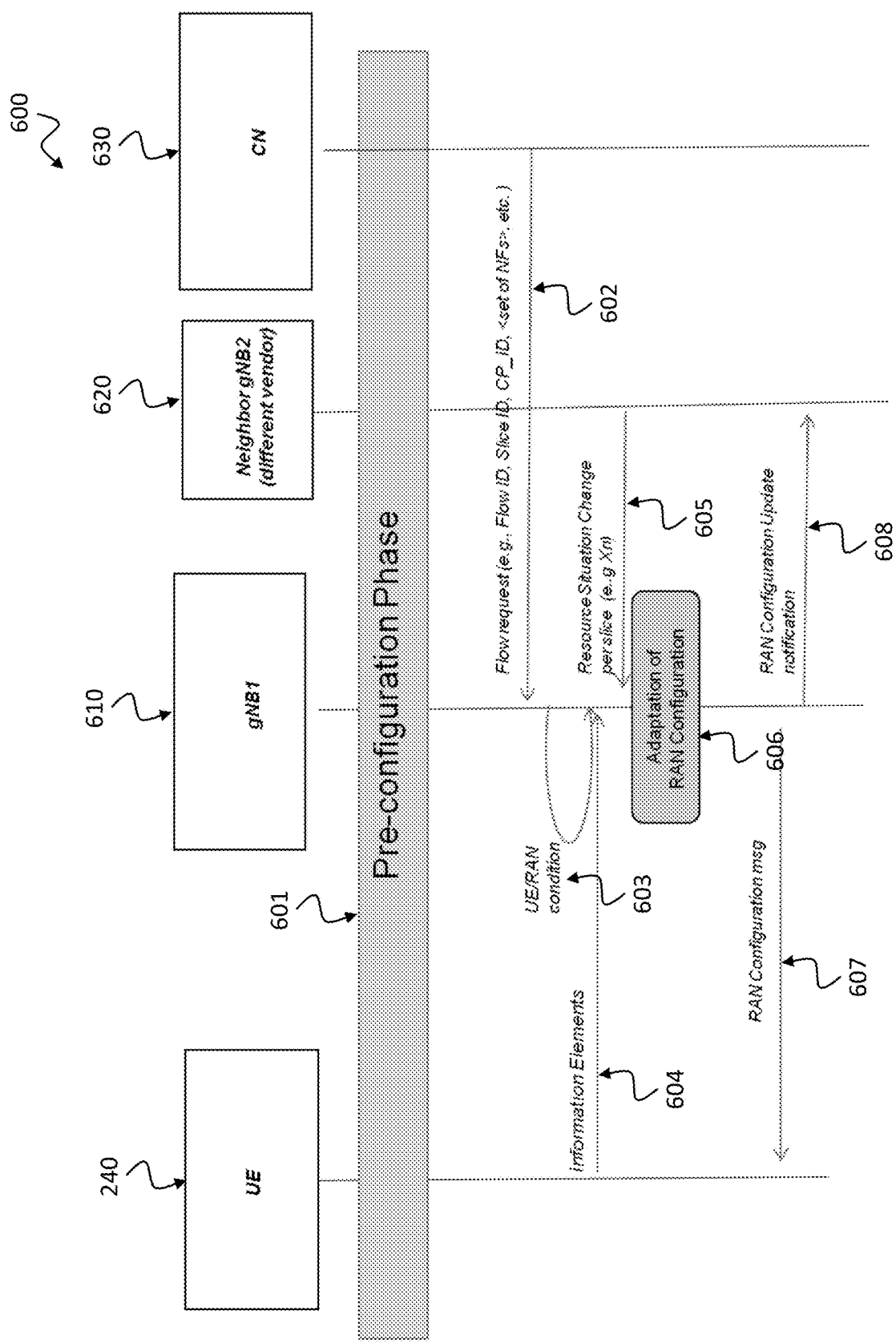
FIG. 6 shows an exemplary message sequence chart 600 for a RAN configuration and adaptation operation according to one embodiment.

FIG. 6 shows an exemplary message sequence chart 600 for a RAN configuration and adaptation operation according to one embodiment. The message sequence chart 600 describes the messages between different entities which are: UE 240, gNB1, 610, e.g., a RAN entity 800 as described below with respect to FIG. 8, neighbor gNB2, 620 (e.g., of different operator or different vendor), e.g., another RAN entity 800 as described below with respect to FIG. 8, and CN 630.

Taking into account the context abstraction, a particular implementation of the identification/enforcement of RAN configurations based on RAN characteristics, slice awareness, abstracted RAN configuration per slice and communication protocols is described in the following. To this end, a function who performs this slice-awareness processing is defined and can include functional elements for: 1) context retrieval (from RAN, UE and CN) which are used for the decision; 2) flows processing and classifying to queues; 3) per queue basis RAN configuration mapping; 4) orchestrating parallel RAN configurations; and/or 5) triggering configurations to involved RAN nodes and the UE.

The processing of traffic flows can include the following: 1) generation of virtual queues for different combinations of communication protocols (CPs), RAN characteristics and abstract RAN configurations; 2) mapping of each queue to a specific RAN configuration; 3) traffic prioritization within each queue and among queues based on SLAs; and/or 4) forwarding of marked PDU data to different PDCP variants.

As can be seen in FIG. 6, after receiving the context from UE 240 and CN 630 (by information elements 604 and flow request 602) and resource situation change indication 605 from neighbor RAN nodes 620, each RAN node 610 performs the RAN configuration and adaptation functionality 606 and sends a RAN_Configuration message 607 (RAN node 610 to user terminal 240) and RAN_Configuration_Update notification message 608 to other RAN nodes 620 (e.g., in a multi-vendor RAN embodiment).

Figure 7:
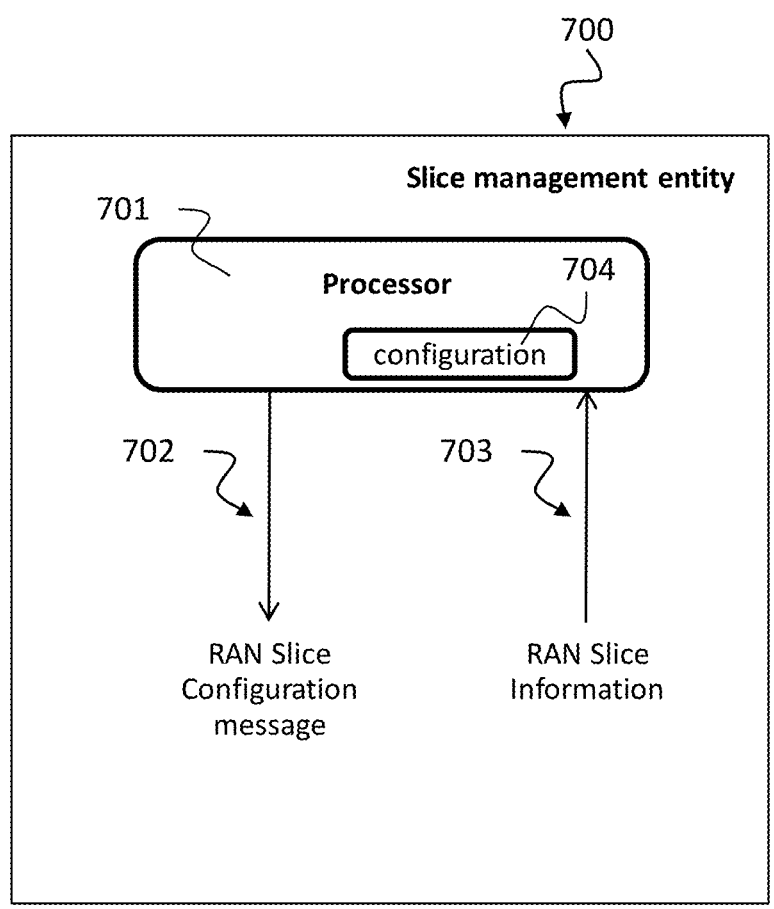
FIG. 7 shows a block diagram of a slice management entity 700 according to one embodiment.

FIG. 7 shows a block diagram of a Slice Management entity 700 according to one embodiment.

The slice management entity 700 may correspond to the slice management RAN entity 222 as described above with respect to FIGS. 2 and 3 that may be used for a RAN 230 as described above with respect to FIGS. 2 and 3. The slice management entity 700 includes a processor 701.

The processor 701 is configured to receive RAN Slice information 703, e.g., information 401 as described above with respect to FIG. 4, in particular at least one key performance indicator (KPI) 221, a slice identifier (ID), and/or NSSAI 226, e.g., as described above with respect to FIGS. 2 and 3. The processor 701 is configured to determine a configuration 704, in particular a pre-configuration, e.g., a pre-configuration 402 as described above with respect to FIG. 4, for at least one slice of the RAN 230 based on the RAN slice information 703, 401. The processor 701 is configured to transmit a RAN slice configuration message, e.g., a message 224, 403 as described above with respect to FIGS. 2 to 4, to the RAN 230 based on the configuration 704.

The configuration 704 may include information for an operation of the slice at the RAN 230, in particular information on a process, a protocol function, and/or a resource required by the slice. The slice management entity 700, 222 may be configured to reside as a RAN domain specific management entity at a DSS 220, e.g. as described above with respect to FIG. 2. The slice management entity 700, 222 may include an interface to a cross domain management entity at a SSS 210, e.g., as described above with respect to FIG. 2, for communicating configuration information 401.

The processor 701 may be configured to receive a context change message, e.g., a message 407 as described above with respect to FIG. 4, from the RAN 230 indicating a change of context with respect to a change of information on a process, a protocol function, and/or a resource of the RAN 230 and/or traffic at the RAN 230. The processor 701 may be configured to adjust the configuration 704 for the RAN 230 based on the change of context.

The context change message 407 may indicate a change of a traffic and/or a requirement related to traffic at the RAN 230, handover requests from a group of UEs 240 and/or a change of backhauling conditions and availability. The processor 701 may be configured to transmit the RAN Slice configuration message 409 based on configuration updates 408 in terms of protocols and RAN functions for the at least one slice, e.g., as described above with respect to FIG. 4.

Figure 8:
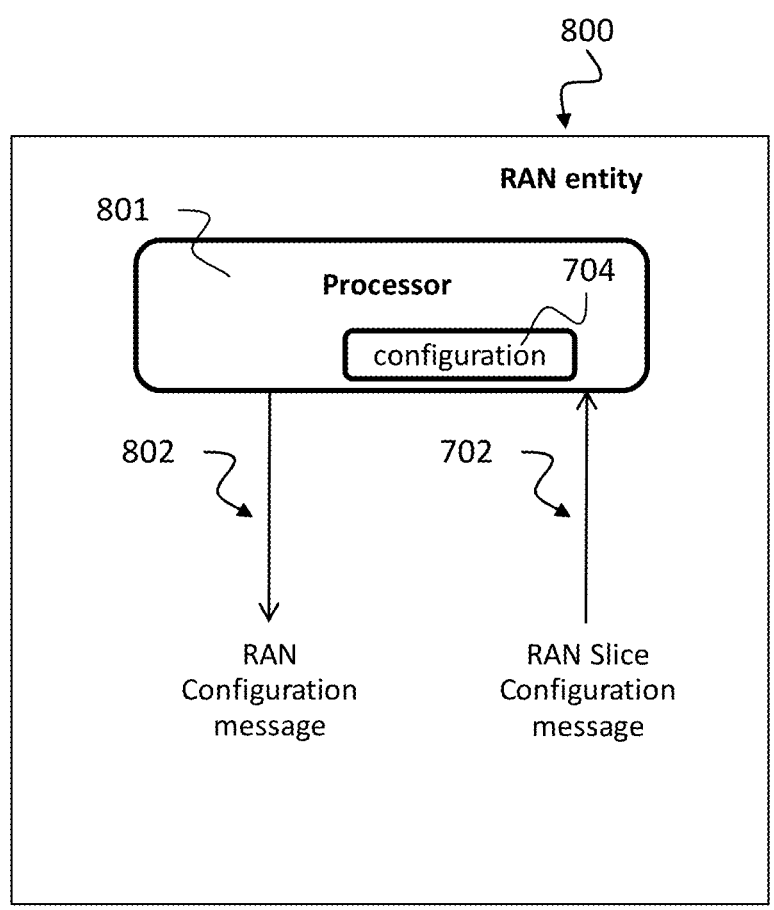
FIG. 8 shows a block diagram of a RAN entity 800 according to one embodiment.

FIG. 8 shows a block diagram of a RAN entity 800 according to one embodiment.

The RAN entity 800 may correspond to an entity of the RAN 230 as described above with respect to FIGS. 2 and 3. The RAN entity 800 includes a processor 801 for processing the different functionality of the RAN entity.

The processor 801 is configured to receive a RAN slice configuration message, e.g., a message 224, 403 as described above with respect to FIGS. 2 to 4, in particular by a slice management entity 700, 222 as described above with respect to FIG. 7. The RAN slice configuration message 224, 403 comprises a configuration 704, in particular a pre-configuration 402 as described above with respect to FIG. 4, for at least one slice of the RAN 230. The processor 801 is further configured to transmit a RAN configuration message 802 to at least one UE 240 based on the RAN slice configuration message 224, 403.

The RAN configuration message 802 may include a slice ID of the at least one slice, at least one network function associated with the at least one slice and/or a flag indicating an uplink or downlink configuration, e.g. as described above with respect to FIGS. 2 to 4.

The RAN slice configuration message 802 may include a configuration update, e.g., an update 408 as described above with respect to FIG. 4, for the at least one slice. The processor 801 may be configured to transmit the RAN configuration message 802 based on the configuration update 408.

The processor 801 may be configured to detect a change of context, e.g. a context change 405 as described above with respect to 4, at the RAN 230, in particular a change of information on a process, a protocol function, and/or a resource of the RAN 230 and/or traffic at the RAN 230, e.g. as described above with respect to FIGS. 2 to 6, and to transmit a context change message, e.g., a message 407 as described above with respect to FIG. 4, to the slice management entity 700, 222 responsive to detecting the change of context 405, e.g., as described above with respect to FIGS. 2 to 6.

The processor 801 may be configured to detect the change of context 405 at the RAN 230 for the at least one slice based on mobility information from the at least one UE 240 associated with the at least one slice of the RAN 230.

The processor 801 may be configured to detect the change of context 405 at the RAN 230 for the at least one slice based on information from at least one neighboring RAN entity 340, in particular a different operator RAN entity 620, e.g., as described above with respect to FIG. 6, the information indicating a change of context at the at least one neighboring RAN entity 340, 620.

The processor 801 may be configured to generate context information based on UE 240 measurements on different AIV, communication protocols and/or slice-related information from the at least one UE 240, the RAN 230 and/or a CN 250, 260 associated with the RAN 230, e.g. as described above with respect to FIGS. 2 to 6.

The processor 801 may be configured to adjust the configuration 704, 606 for the at least one slice of the RAN 230 according to user and/or slice requirements based on the context information, e.g., as described above with respect to FIGS. 6 and 7.

The processor 801 may be configured to generate the context information based on information from adjacent RAN nodes 340 and/or adjacent base station 620, in particular information about capability, load, backhaul and/or cell density, e.g., as described above with respect to FIGS. 3 to 6. The information from the CN 250, 260 may comprise PDU type and/or communication protocol indication 530, e.g., as described above with respect to FIG. 5. The information from the CN 250, 260 may be indicated via RAN-to-core-network interface 261 on UP or via RAN-to-core-network interface 251 signaling on CP, e.g., as described above with respect to FIGS. 2 and 3.

The present disclosure also supports a computer program product including computer executable code or computer executable instructions that, when executed, causes at least one computer to execute the performing and computing steps described herein, in particular the steps of the method described above. Such computer program product may include a readable non-transitory storage medium storing program code thereon for use by a computer. The program code may perform the processing and computing steps described herein, in particular the method described above.

In the following, further example implementations are described.

A first example is related to a two phase RAN configuration to support slice-aware RAN adaptation, comprising: a procedure and signal exchange in pre-configuration phase to decide on initial RAN configuration; and a procedure and signal exchange in run time adaptation phase to decide on RAN configuration adaptation.

A second example is related to an apparatus at RAN management entity to decide on initial RAN configuration, comprising: receiving RAN capability, per slice KPI to decide on slice-pre configuration mapping table; receiving slice ID (slice type) to decide on the abstraction of pre-configuration in the pre-configuration phase; sending abstract information on decided pre-configuration and adaptation to the RAN element; and report supported slice type to SSS and RAN Mgmt from other operators/vendors.

A third example is related to an apparatus at RAN management entity to decide on RAN configuration adaptation, including: receiving information on resource changes for the adaptation phase from RAN elements; receiving resource and context changes from RAN elements for the configuration adaptation; sending information on decided configuration adaptation to the involved parties (e.g., RAN element, mobile terminal); and report abstracted information on configuration adaptation to SSS and RAN Mgmt from other operators/vendors.

A fourth example is related to an apparatus at RAN element to support RAN configuration and adaptation decision, comprising: report the resource/context change to RAN control entity.

A fifth example is related to a method to determine RAN configuration variants given the following constraints: communication protocol; slice-awareness; radio access network characteristics (e.g., user mobility, density, spectrum, AI, CU/DU).

The solution described in this disclosure is standard relevant. Various messages and information elements may require changes in the signaling exchanged over some standardized interface (e.g., Uu, X2 and NG-C/U interfaces).

The disclosed solution also addresses the abstraction of pre-configuration, adaptation within one pre-configuration to actual use case and the adaptation of the pre-configuration itself. The change of RAN capability which is bind to pre-configuration needs to be reported via NBI of the RAN management plane to outside (e.g., e2e slice orchestrator). This can be observed by the signaling over NBI interface of the RAN management plane.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A slice management entity for a radio access network (RAN), comprising:
 a processor configured to:
  receive RAN slice information including an RAN slice identifier (ID), network slice selection assistance information (NSSAI), and a plurality of key performance indicators (KPIs),
  determine a configuration, including a pre-configuration that indicates an expected range of KPIs of the plurality of KPIs, for at least one RAN slice of the RAN based on the RAN slice information, wherein the configuration comprises information for an operation of the at least one RAN slice of the RAN including information on at least one of: a process, a protocol function, or a resource required by the at least one RAN slice,
  receive a context change message from the RAN indicating a change of context with respect to at least one of, a change of information on a process, a protocol function, a resource of the RAN, or traffic at the RAN,
  adjust the configuration for the RAN based on the change of context,
  transmit a RAN slice configuration message to the RAN based on the configuration as adjusted, and transmit the RAN slice configuration message based on configuration updates to the configuration in terms of protocols and RAN functions for the at least one RAN slice.

2. The slice management entity of claim 1, wherein the slice management entity is configured to reside as a RAN domain specific management entity at a domain support system (DSS); and further comprising an interface to a cross domain management entity at a slice support system (SSS) for communicating configuration information.

3. The slice management entity of claim 1, wherein the context change message indicates at least one of: a change of a traffic, a requirement related to traffic at the RAN, handover requests from a group of user equipment (UE), or a change of backhauling conditions and availability.

4. A radio access network (RAN) entity, comprising:
a processor configured to:
  receive a RAN slice configuration message from a slice management entity, wherein the RAN slice configuration message comprises a configuration, including a pre-configuration, and a configuration update for at least one RAN slice of the RAN, the configuration comprising information for an operation of the at least one RAN slice including information on at least one of: a process, a protocol function, or a resource required by the at least one RAN slice of the RAN, wherein the configuration is determined, by the slice management entity, based on RAN slice information including an RAN slice identifier (ID), network slice selection assistance information (NSSAI), and a plurality of key performance indicators, (KPIs), and
  transmit a RAN configuration message to at least one user equipment (UE) based on the RAN slice configuration message and the configuration update, wherein the RAN configuration message includes at least one of: a slice ID of the at least one RAN slice, at least one network function associated with the at least one RAN slice, or a flag indicating an uplink or downlink configuration,
  wherein the pre-configuration indicates an expected range of KPIs of the plurality of KPIs,
  wherein the processor is further configured to;
    detect a change of context at the RAN including at least one of: a change of information on a process, a protocol function, a resource of the RAN, or traffic at the RAN, and
    transmit a context change message to the slice management entity responsive to detecting the change of context,
  wherein the RAN slice configuration message from the slice management entity includes the configuration that has been adjusted based on the change of context.

5. The RAN entity of claim 4, wherein the processor is further configured to:
  detect the change of context at the RAN for the at least one slice based on mobility information from the at least one UE associated with the at least one slice of the RAN.

6. The RAN entity of claim 4, wherein the processor is further configured to:
  detect the change of context at the RAN for the at least one slice based on information from at least one neighboring RAN entity including a different operator RAN entity, the information indicating a change of context at the at least one neighboring RAN entity.

7. The RAN entity of claim 4, wherein the processor is further configured to generate context information based on at least one of: UE measurements on different air interface variants (AIV), communication protocols, slice-related information from the at least one UE, the RAN, or a core network (CN) associated with the RAN.

8. The RAN entity of claim 7, wherein the processor is further configured to adjust the configuration for the at least one slice of the RAN according to user or slice requirements based on the context information.

9. The RAN entity of claim 7, wherein the processor is further configured to generate the context information based on information from adjacent RAN nodes or adjacent base station including information about capability, load, backhaul or cell density.

10. The RAN entity of claim 7, wherein the information from the CN comprises packet data unit (PDU) type or communication protocol indication.

11. The RAN entity of claim 10, wherein the information from the CN is indicated via RAN-to-core-network interface on user plane (UP) or via RAN-to-core-network interface signaling on control plane (CP).

* * * * *

UNITED STATES PATENT AND TRADEMARK OFFICE
CERTIFICATE OF CORRECTION

Page 1 of 1

PATENT NO. : 11,729,711 B2
APPLICATION NO. : 16/570919
DATED : August 15, 2023
INVENTOR(S) : Emmanouil Pateromichelakis, Qing Wei and Chenghui Peng It is certified that error appears in the above-identified patent and that said Letters Patent is hereby corrected as shown below:

In the Claims

In Claim 1, Column 14, Lines 60-61, delete "at least one of, a change" and insert --at least one of: a change--.

In Claim 1, Column 14, Line 65, delete "change of context," and insert --change of context:--.

In Claim 4, Column 15, Line 33, delete "key performance indicators, (KPIs)," and insert --key performance indicators (KPIs),--.

In Claim 4, Column 15, Line 44, delete "further configured to;" and insert --further configured to:--.

Signed and Sealed this
Thirty-first Day of October, 2023

Katherine Kelly Vidal
*Director of the United States Patent and Trademark Office*